United States Patent [19]

Marks

[11] Patent Number: 5,151,821
[45] Date of Patent: Sep. 29, 1992

[54] SYSTEM AND DEVICES FOR TIME DELAY 3D

[76] Inventor: Mortimer Marks, 166-17 Cryders La., Whitestone, N.Y. 11357

[21] Appl. No.: 604,089

[22] Filed: Oct. 25, 1990

[51] Int. Cl.⁵ .............................................. G02B 27/22
[52] U.S. Cl. .................................... 359/462; 358/88; 359/473
[58] Field of Search ................ 350/130, 132; 359/462, 359/464, 473, 471; 358/88

[56] References Cited

U.S. PATENT DOCUMENTS

| 3,445,153 | 5/1969 | Marks et al. | 350/144 |
| 4,836,647 | 6/1989 | Beard | 350/132 X |
| 4,893,898 | 1/1990 | Beard | 350/132 |

*Primary Examiner*—Scott J. Sugarman

[57] ABSTRACT

This invention relates to the production of 3-D TV or motion pictures using novel electro-opto-mechanical devices. The system utilizes a continuous panning camera. The images are viewed through photopic and scotopic filters incorporated into a viewer or special lenticular or raster screen. Use of the screen replaces the viewers.

20 Claims, 10 Drawing Sheets

SYSTEM AND DEVICES FOR TIME DELAY 3D

CROSS REFERENCES TO RELATED APPLICATIONS

[1] U.S. Pat. No. 3,445,153 issued May 20, 1969 to Alvin M. Marks and Mortimer M. Marks

[2] U.S. Pat. No. 4,602,856 issued Jul. 29, 1986 to Mortimer Marks

Statements as to Rights to Inventions made under Federally Sponsored Research and Development:

No Federal Funds have been used for the Research and Development of this Invention.

BACKGROUND OF THE INVENTION

1. Field of the Invention

This invention relates to the production of 3D TV or Motion Pictures using novel electro-opto-mechanical devices. The system utilizes a continuous panning camera, a screen, and the images are viewed through photopic and scotopic filters using eyeglasses or a special raster screen. The photopic and scotopic filters and glasses have been described. [1,2]. Scenes photographed by the device of this invention are compatible with standard motion pictures and TV, the viewer seeing such scenes in 2D. However when such scenes are seen through scotopic-photopic eyeglass viewers, or through a photopic-scotopic raster described hereinafter, such scenes consistently appear in 3D. The scenes may be recorded on film, VCR tape or transmitted live via broadcast or cable.

2. Description of the Prior Art

The Pulfrich Effect is well known, originally demonstrated with an eyeglass viewer having a dark neutral density filter of about 10% transmittance over one eye, and no filter over the other eye. The dark filter induced scotopic (rod) vision in one eye, and the eye with no filter had the normal photopic (cone) vision. The photopic scotopic viewers [1,2] used two filters one yellow or yellow green to induce photopic (cone) vision, and the other neutral violet to induce scotopic (rod) vision. The three dimensional effect produced is due to a natural time delay between the transmission of signals of a photopic image in a first eye, and a scotopic image in a second eye to the visual area in the rear of the brain via the optic nerve fibres. Thus, images of objects in a scene which move with horizontal velocity are displaced on the visual area of the brain, and cause the images to be perceived in three dimension.

The photopic-scotopic viewers of the prior art produced excellent 3D images of certain scenes in which objects at certain distances moved in a particular direction with a particular velocity, which may be expressed as an angular velocity. A preferred angular velocity produced an excellent three dimensional effect, which otherwise did not appear. An example of a scene in which objects have a preferred angular velocity is a parade with marchers moving in a left to right direction with a velocity of about 0.5 to 1.5 m/s, and 1–20 m distant from the camera; that is, with an angular velocity of about $2. \times 10^{-2}$ to 2. radians per sec. (about 1.2 to 120°/sec, respectively) and viewed with the photopic lenses (yellow) on the left eye, and scenes having moving objects in an opposite direction produce a pseudoscopic effect, or scenes with no motion, as with still objects, produce no 3D effect at all. The lack of consistent 3D normally experienced and expected was disconcerting, and prevented the commercial success of the prior art photopic-scotopic glasses.

Prior art Pat. Nos. 4,705,371 issued Nov. 10, 1987 [4], 4,836,647 issued Jun. 6, 1989 [5] and 4,893,898 issued Jan. 16, 1990 all to Terry D. Beard record a scene in a camera by providing a relative lateral motion between the objects in a scene and the recording mechanism by rotating the objects on a turntable. This method is limited to a special setup; and cannot be used with live scenes where the lateral motion of objects is uncontrolled or nonexistent.

SUMMARY OF THE INVENTION

Definitions

Deflector: An Optical device such as a Mirror or Internal Reflecting Prism for redirecting light rays.

Object: A part of a scene which may be moving in any manner or stationary, fixed.

Panning: A radius vector through a fixed and moving object moving with an angular velocity about a point on the fixed object.

OBJECTS OF THE INVENTION

An object of this invention is to provide a panning camera for the continuous panning of objects of a scene while the camera is stationary or moving.

A further object of this invention is to provide a panning camera in which the time delay 3D effects are controlled.

Another object of this invention is to provide a compatible projected image in color or black and white appearing as a standard 2D color or black and white image when viewed without a photopic scotopic viewer or raster, and which produces a consistent and continuous time delay 3D image when viewed with a photopic viewer or raster.

Another object of this invention is to provide a time delay 3D System in which images may be viewed without wearing photopic glasses, by employing a photopic scotopic raster of this invention.

A still further object of this invention is to obviate the framing effect of the screen border by providing moving patterns of light and dark or color contiguous to the border.

These and other objects will become apparent from the disclosure herein.

SUMMARY

The system and devices disclosed herein comprise a novel continuous panning camera for still or moving objects in a scene, a standard screen, and photopic scotopic viewing filter in an eyeglass or raster screen between the projected image and the observer. The image information from the continuous panning camera is encoded as a compatible image in color or black and white which may be transmitted to a standard TV receiver or motion picture screen, or recorded on film or tape. The image may be viewed without photopic scotopic filters in which case it appears as a 2D image. However if viewed through photopic scotopic filters via an eyeglass or a raster screen a 3D time delay image appears consistently and continuously.

A moving pattern contiguous with the image border is provided to obviate the window created by the image border; and, various horizontally moving objects with controlled velocities may be electronically introduced to the scene for special 3D effects.

BRIEF DESCRIPTION OF THE DRAWINGS

FIG. 4a with a central deflector having $\pm 45°$ angular positions for continuously panning objects in a scene; and, FIG. 4b with two cameras.

DESCRIPTION OF PREFERRED EMBODIMENTS

Figure 1:
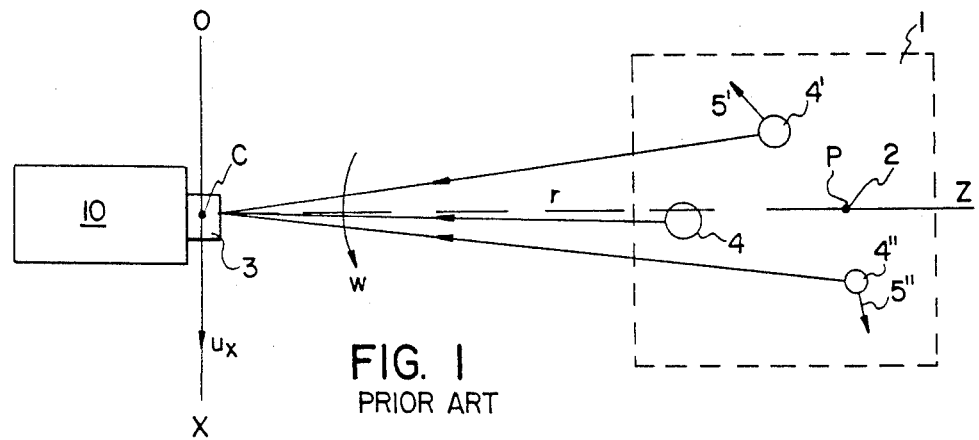
FIG. 1 shows a diagrammatic plan view of a prior art camera panning a scene.

In FIG. 1 there is shown a prior art panning of a scene 1 about an arbitrary fixed point 2 by a conventional camera 1. The optical axis OZ of the camera lens 3 passes through the optical center C of the lens 3 and P the fixed point 2 in the scene 1. $OP = r$ is the distance of the optical center C to the arbitrary fixed point P. An OXYZ rectangular coordinate system has its OZ axis coincident with the optical axis of the lens 3, and its OX axis horizontal in the direction of the panning velocity vector $u_x$. The angular velocity of panning is given by:

$$\omega = u_x / r \tag{1}$$

The scene 1 has many objects 4, 4', 4", . . . which may be stationary 4, or have a velocities in any direction shown by the arrows 5', 5", . . . There is no velocity vector on object 5 because its velocity is zero. In the prior art there were three ways to obtain an angular velocity suitable for displaying a good time delay 3D image: (1) The camera stationary and recording for example, a parade or sports event with a substantially unidirectional horizontal motion from left to right. (2) The camera panning a stationary scene with a an optimum velocity $u_x$ (3) Objects in the scene are placed on a rotating turntable. None of these methods were capable of general use, because many scenes have still objects which do not induce time delay, or objects with velocities in a direction which induce a time delay pseudoscopic image. Occasionally the angular velocity of objects was optimum and excellent time delay 3D was obtained. This was disconcerting, because viewers expect consistently good 3D images, and feel frustrated when no 3D is seen, confusing pseudoscopic images appear, or an occasional good scene falls flat. This situation prevented the commercial success of prior art time-delay 3D systems and devices. The problem of producing continuous and consistent time delay 3D with all scenes is solved by the present invention.

FIG. 2 shows a basic embodiment of a optical system of a panning camera of this invention. An OXYZ rectangular coordinate system with its OX axis horizontal is shown. Scene 1 is panned with an angular velocity relative to the optical axis OZ of the camera lens 3, about an arbitrarily selected fixed point P located at coordinate $0,0,z_0$. This is accomplished by imparting a linear velocity $u_x$ to a rotator-translator deflector 6 and an angular velocity $a/2$ along a track on the OX axis from position $x = a_1$ to position $x = a_2$. Light from an object 4 in the scene is deflected by rotator-translator deflector 6 to a fixed 45° deflector 7. When deflector 6 reaches position $a_2$, it returns to position $a_1$ and the cycle is repeated. The forward and reverse velocities may be controlled manually or programmed by servo-control device 11. As an example, a panning camera with these characteristics produced excellent time delay 3D on a continuous and consistent basis:

| Item Description | | Values and Units |
|---|---|---|
| Fixed 45° Deflector 7 | (3.5") | 8.75 cm squ. |
| Rotator-Translator Deflector 6 | (6.") | 15. cm squ. |
| Travel distance minimum | $a_1 = 5"$ | 12.5 cm |
| Travel distance maximum | $a_2 = 8"$ | 20. cm |
| Travel time | | 6 s |
| Translator velocity | $u_x = 0.5"/s$ | $1.25 \times 10^{-2}$ m/s |
| Rotator Angular Velocity | 0.01 rad/sec | about 0.6°/s |
| Deflector B rotates about 2° at 30 ft; 0.03 rad at 9 m. in 6 sec. or $\omega/2 =$ about 0.005 radians/sec. | | |

Figure 2B:
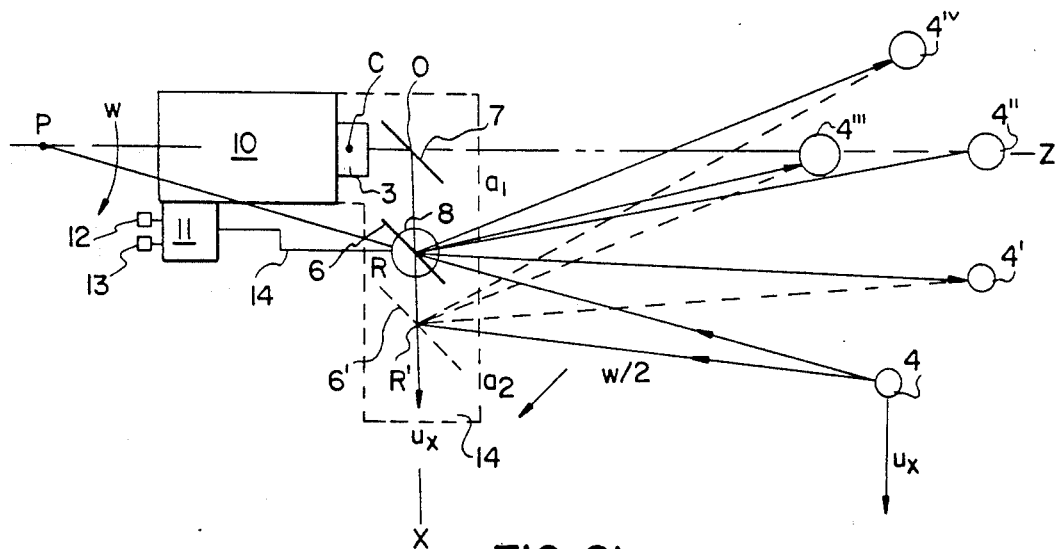
FIG. 2b shows a diagrammatic plan view of a single lens panning camera of this invention with a single rotator-translator deflector.
Figure 2A:
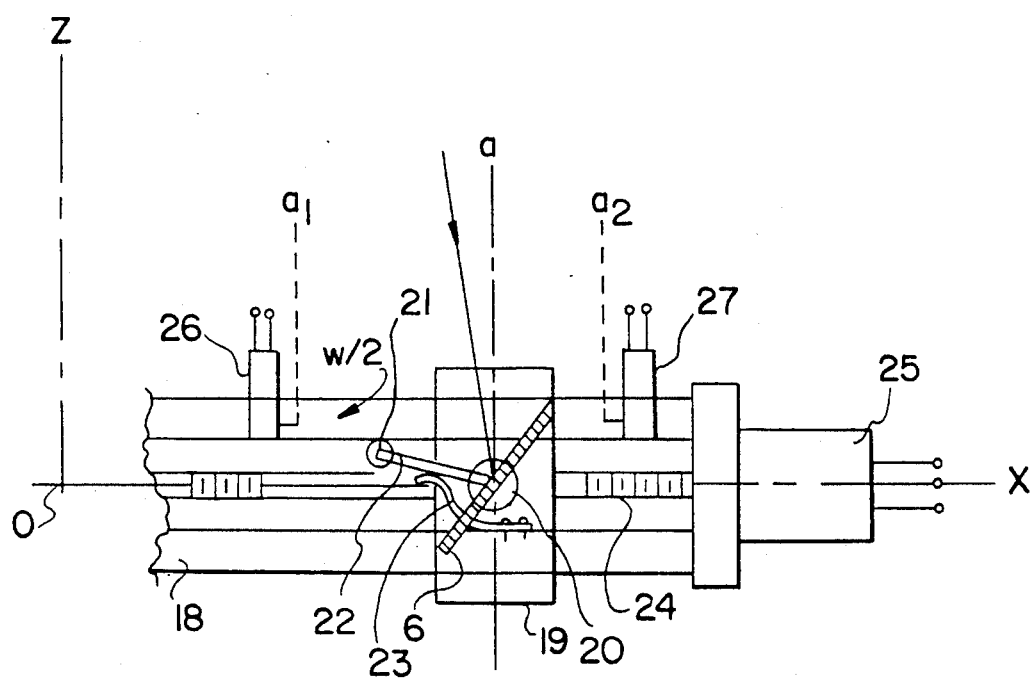
FIG. 2a shows a plan view of the drive mechanism for a single rotator-translator deflector of this invention.

FIG. 2a shows a mechanism for actuating the rotator translator deflector 6. A track structure 18 supports the mounting 19 for the rotator translator deflector 6. A vertical shaft 20 is supported by mounting 19, and is free to rotate through a small angle $\theta$. linear cam 21 is mounted on the track structure 18. A cam follower 22 is mounted on the shaft 20, and pressed against the cam 21 by leaf spring 23. A drive rod 24 threaded through a nut on mounting 19 is rotated clockwise or counterclockwise by reversing motor 25. Limit switches 26 and 27 are located respectively at $x = a_1$ and $x = a_2$ on track structure 18. When the deflector mounting 19 reaches x=a₂ the limit switch 27 is actuated, and the motor 25 reverses, reversing the velocity of the rotator-translator deflector 6 from $+u_x$ to $-u_x$; and its angular velocity from $-\omega/2$ to $+\omega/2$. When the mounting 19 again reaches x=a₁ at the limit switch 26, the velocity of the deflector 6 reverses from $-u_x$ to $+u_x$, and its angular velocity is reversed from $+\omega/2$ to $-\omega/2$.

FIG. 2b shows another embodiment of a panning-camera of this invention with panning controls. The panning camera in this embodiment comprises a camera 10 having a lens 3 with a center C on the optical axis OZ, an A deflector 7 with a 45° reflecting plane intersecting the optical axis at point O, the origin of the OXYZ coordinates with the OX axis horizontal, and a B rotator translator deflector 6. A rotator-translator servodrive mechanism 8 provides the angular velocity $\omega/2$, and the translation velocity $u_x$ of the deflector 6. The servodrive 8 is connected via cable 9 to servo control box 11. Dials 12 and 13 on the control box 11 manually set the angular velocity and the linear velocity of the rotator translator deflector 6. Alternatively, these variables may be computer programmed. In this manner the rotator deflector 6 is rotated and translated respectively with an angular velocity $\omega/2$, and a linear velocity $u_x$. A mounting 14 is provided to attach the camera 10, the track structure 18, the fixed deflector 7, the rotator-translator deflector 6 and its servodrive 8, and the control box 11.

Figure 3A:
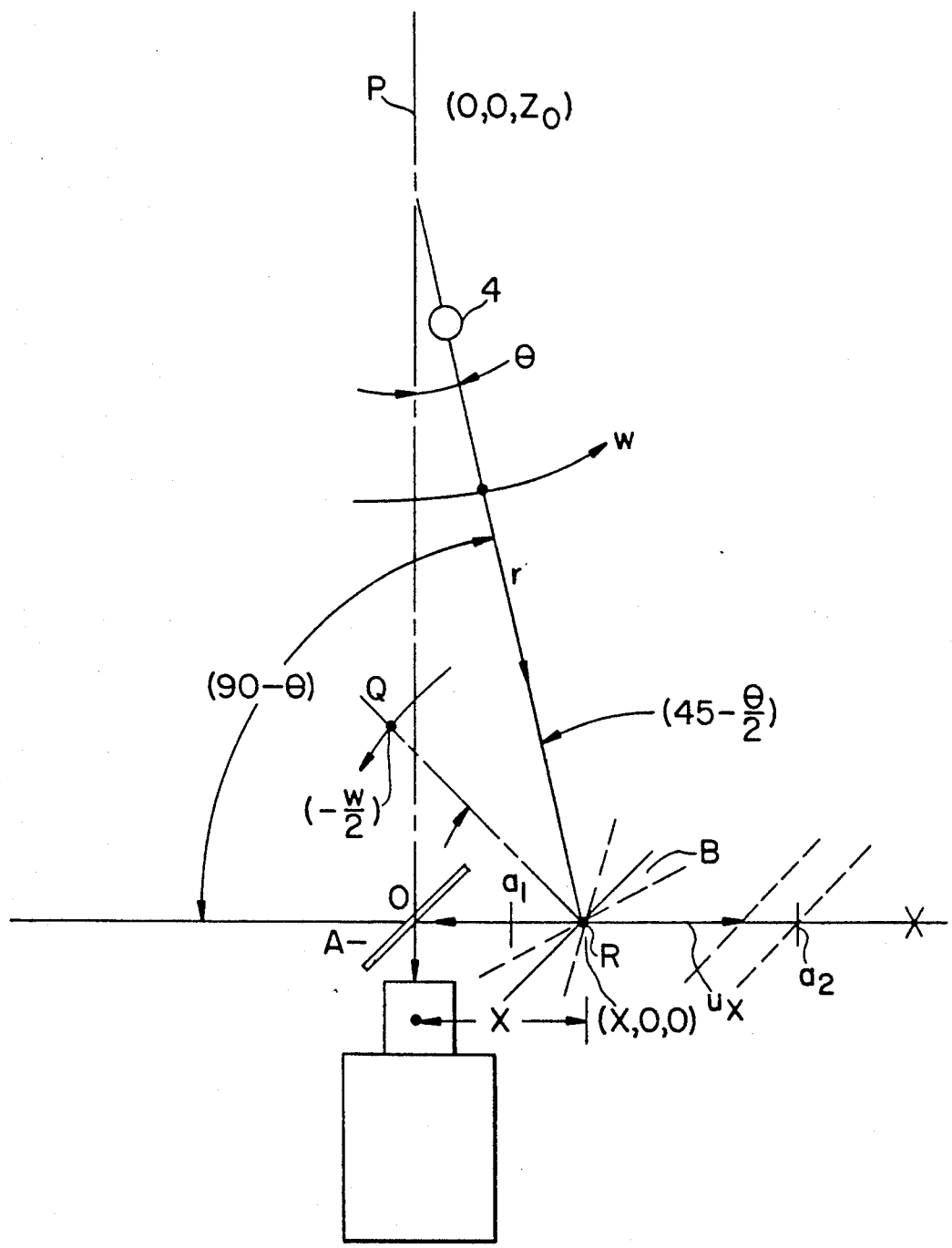
FIGS. 3a and 3b are physical optics diagrams of plan views of a single lens panning camera of this invention with a single rotator-translator deflector panning objects in a scene, with forward and rearward fixed points, respectively.
Figure 3B:
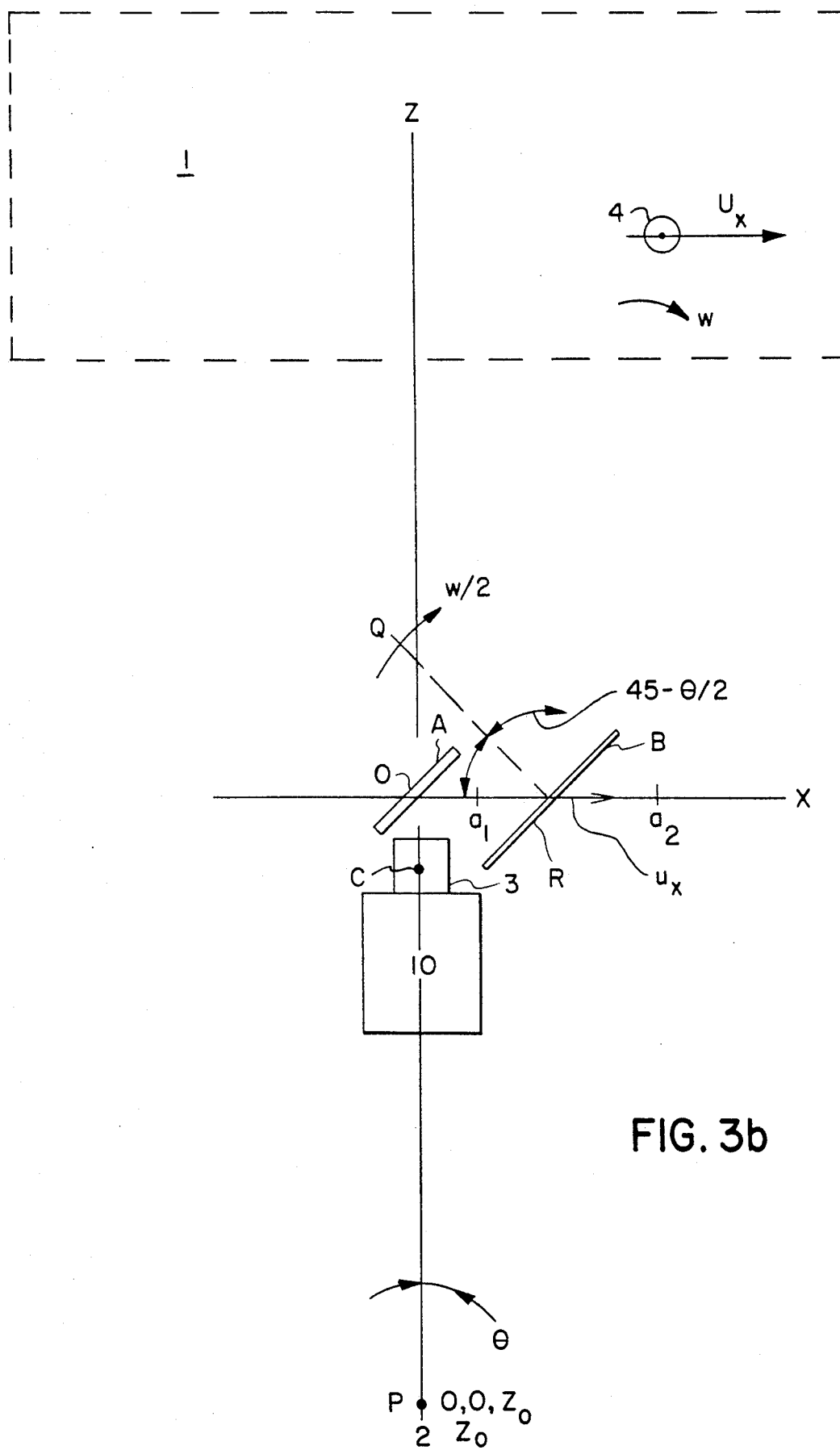

FIGS. 3a and 3b show physical optics diagrams of a plan view of a single lens panning camera panning about a fixed point P on OZ for the recording of time delay three dimensional images of objects in a scene. FIG. 3a shows the fixed point P on the axis OZ in front of the camera 10. FIG. 3b shows the fixed point P on the axis OZ in the rear of the camera 10.

The reflecting plane of B deflector 6 intersects the OX axis at point R where x=a, the angle OPR being defined as $\theta = a/r$ radians, where r=distance PR from point R to fixed point P on the optical axis. The angular velocity of panning about the fixed point P is $(dO/dt)=\omega$; the reflecting plane of deflector B makes an angle of $(45°-\theta/2)$ between its normal RQ and the OX axis. The servodrive 8 rotates deflector B with an angular velocity $-\omega/2$ from $\theta_1$ to $\theta_2$ about an axis parallel to the OY axis through point R, simultaneously translating point R on deflector B along the OX axis with linear velocity $u_x = \omega r$, from minimum distance x=a₁ to a maximum distance x=a₂, periodically returning deflector 6 to x=a₁ and $\theta=0_1$. In this manner the scene is continuously panned by the panning-camera relative to the optical axis OZ of the camera, and the scene is recorded and encoded as a time-delay three dimensional image.

FIG. 3a is a physical optics diagram of a plan view of a the panning camera of this invention in which the fixed point P on axis OZ is forward of the camera 10 at 0,0,z₀. The rotator deflector B is moving from left to right with a velocity $u_x$. The corresponding angular velocity of object 4 located at z=z₁ around the point P is $\omega$, and the linear velocity is $U_x$; where:

$$U_x = u_x(OP-z_1)/OP \qquad (2).$$

and the deflector 6 rotates with an angular velocity $\omega/2$.

FIG. 3b is another physical optics diagram of a plan view of a panning camera device of this invention in which the fixed point P on axis OZ is rear of the camera 10 at 0,0,−z₀. The rotator deflector B is moving from left to right with a velocity $u_x$. The corresponding panning motion about point P of the object 4 at z=z₁ is a linear velocity $U_x$ and an angular velocity. The relation between $U_x$ and $u_x$ is:

$$U_x = u_x(OP-z_1)/OP \qquad (3)$$

Figure 4A:
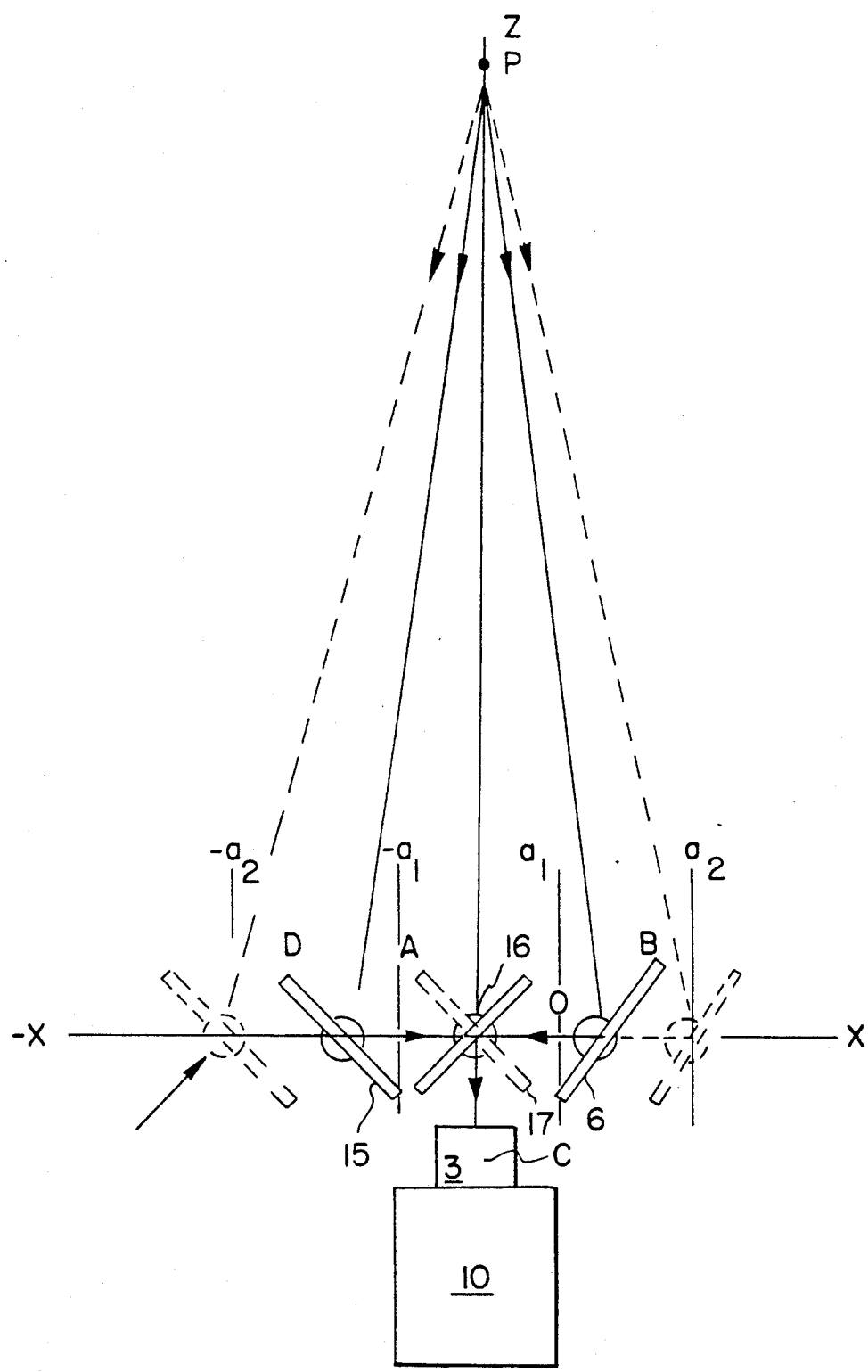
FIGS. 4a and 4b are diagrammatic plan views of a panning camera of this invention with two rotator-translator deflectors.

FIG. 4a is a diagrammatic plan view of a single lens panning camera with two outboard systems for the continuous panning and recording of time delay three dimensional images of objects in a scene. It comprises right and left rotator-translator deflectors B and D. The left rotator-translator D deflector 15 functions in the same manner as the right rotator-translator B deflector 6 described in FIG. 2b. The rotator-translator deflector 15 is located on the −OX axis with a minimum distance x = −a₁ and a maximum distance x= −a₂. A second servodrive 28 rotates and translates the deflector 15 with an angular velocity $\omega/2$, and a linear velocity $u_x$. A central rotator 16 at 0 rapidly rotates the A deflector 17 by ±90° in 0.03 sec or less. When the deflector 6 reaches the position x=a₂, and deflector 15 is at x=−a₂, rotator 16 rapidly rotates the A deflector 17 through −90°, from +45° to −45°, thereby switching the light path from deflector 6 to deflector 15; that is, from the right to the left. When the deflector 15 reaches −a₁, the deflector 6 is at +a₁, and the rotator 16 rapidly rotates the A deflector 17 through a +90° angle; whereupon light from the scene to the lens is switched from the left path to the right path via deflector 6. The deflectors 6, 15 and 17 are programmed to provide continuous panning in either direction. The cycle starts when deflector 17 is at 45° and receives light from deflector 6 at position a₁. Deflector 6 moves to the right to position a₂. The deflector 17 is then suddenly rotated to −45° and receives light from Deflector 6 which is now at position −a₂ and moving to the right with a velocity $+u_x$ until it reaches position −a₁. While deflector 15 is moving to the right, deflector 6 is returning from position +a₂ to +a₁. When deflector 15 reaches position −a₁, deflector 6 reaches position +a₁; deflector 17 suddenly rotates +90°, and the cycle repeats. Thus the deflectors 6 and 7 move in equal and opposite directions, reaching their closest points to the origin at +a₁ and −a₁, and their furthest points +a₂ and −a₂ at the same time; however, light is admitted to the lens 3 only when each deflector is moving from left to right with a velocity $u_x$. Switching of the light paths occurs at their closest points and their furthest points. The angle to fixed point P between their closest positions is: $2\theta_1 = 2 a_1/r$; for example: 2a₁ =0.1 m, r=4 m ; hence: $2\theta_1 = 0.1/4 = 0.025$ rad = 1.5°; and, the angle to the fixed point P at their furthest positions is $2\theta_2 = 2 a_2/r$; for example, 2 a₂=0.53 m; $2\theta_2/r = 0.53/4 = 0.13$ rad = 6.4°. During the switching of the light paths, the image on the screen of the fixed point does not shift, but objects closer to the camera lens do shift through a small angle; and, the switching time of the light paths is less than about 0.03 sec. In practice, the result is: switching from the right to the left path, or vice versa, is imperceptible in the screen images.

Figure 4B:
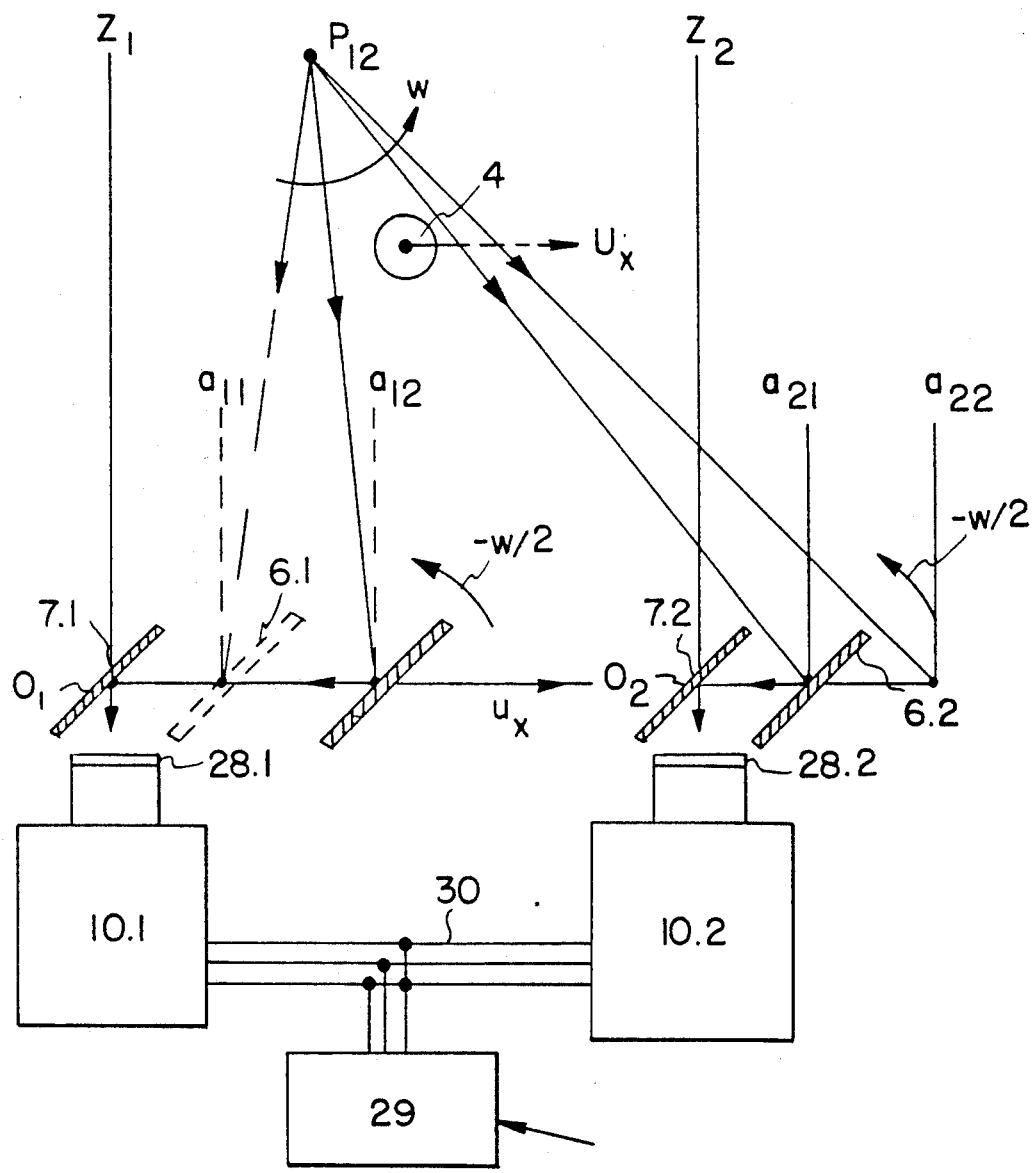

Various scanning conditions may be selected using these control variables:

1. Panning from right to left, or left to right,
   by changing the timing of ±90° deflector 17.
2. Translation Velocity $u_x$
3. Angular Velocity $\omega/2$ -continued 4. Distance of the radius r = OP to the arbitrary fixed point P is determined by the ratio
$r = u_x/\omega$ FIG. 4b shows a diagrammatic plan view of a two-camera two-rotator-translator panning programmed for continuous panning. Left camera 10.1 opens to light when the right camera 10.2 is blocked to light; and, viceversa. Fixed 45° deflectors 7.1 and 7.2 reflect light from rotator-translator deflectors 6.1 and 6.2, respectively. Each camera is open to light from its corresponding rotator-translator deflector only when its deflector is moving to left to right. When Deflector 6.1 starts at position $a_{11}$ and moves toward the right, and camera 10.1 is open to light. Simultaneously, deflector 6.2 is at position $a_{22}$ and starts to move from right to left while light to camera 10.2 is blocked. When deflector 6.2 reaches position $a_{21}$, deflector 6.1 has reached position $a_{12}$, and camera 10.2 opens to light. This is accomplished when shutter 28.2 on camera 10.2 opens, and when shutter 28.1 on camera 10.1 closes. Alternatively, if cameras 10.1 and 10.2 are electronic (TV) cameras, electronic blanking and unblanking may preferably be employed, instead of shutters. The rotator-translator deflectors return to their initial positions after each cycle. The operating conditions may be manually controlled or programmed.

Figure 5:
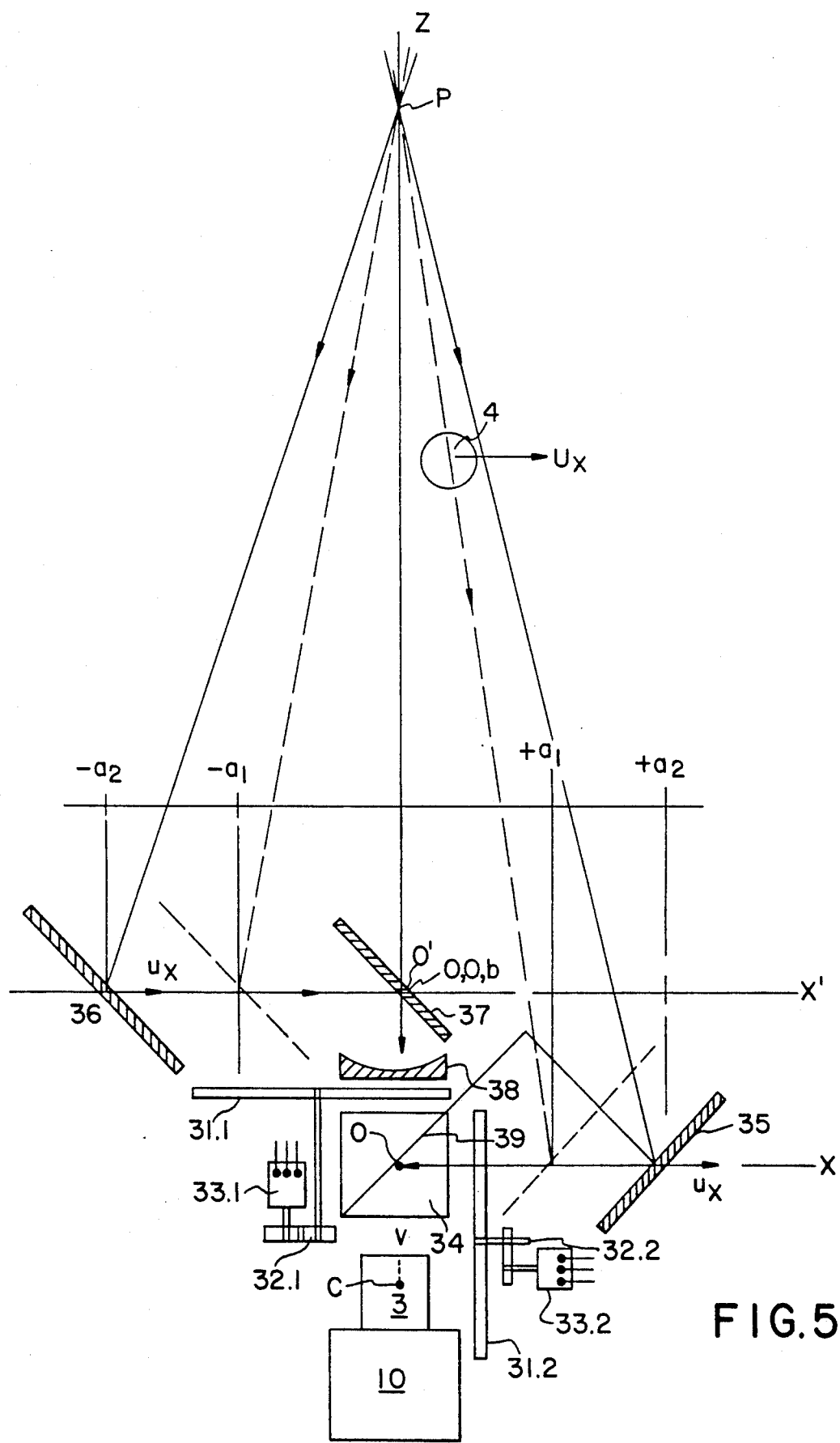
FIG. 5 is a diagrammatic plan view of a single lens panning camera of this invention with two rotator-translator deflectors, a beam splitter and two shutters for continuously panning objects in a scene.

FIG. 5 shows a diagrammatic plan view of another embodiment of a single lens continuous panning camera for producing time delay three dimensional pictures. Lens 3 of Camera 10 is located on its optical axis OZ, with the OX axis horizontal. The right image is reflected by the right rotator translator deflector 35 to the fixed 45° reflecting plane of the beam splitter cube 34 which reflects it along the OZ axis toward the lens 3. An O'X' axis is spaced a distance b in front of the OX axis. The left image from rotator translator deflector 36 passes along the O'X' axis to the fixed 45° deflector 37, which reflects the left image to the beam splitter cube 34. The beam splitter cube 34 transmits the left image along the OZ axis to the lens 3. The left rotator translator deflector 36 travels from $x = -a_2$ to $x = -a_1$ on the O'X' axis with a velocity $u_x$. The right rotator translator deflector 35 travels from $x = a_1$ to $x = a_2$ along the OX axis with a velocity $u_x$ and reflects the light from the scene to the half-reflecting plane 39 of the beam splitter cube 34, and thence to the camera lens 3. A compensator lens 38 equalizes the size and focus of the right and left images at the camera. Shutter 31.1 is open to light from the left path when shutter 31.2 is closed to light from the right path, and vice versa. The shutters 31.1 and 31.2 are mounted on shafts 32.1 and 32.2 and driven by sychronous motors 33.1 and 33.2 respectively. While rotating synchonized mechanical shutters are shown it will be understood that electrooptic shutters may be substituted.

Figure 6:
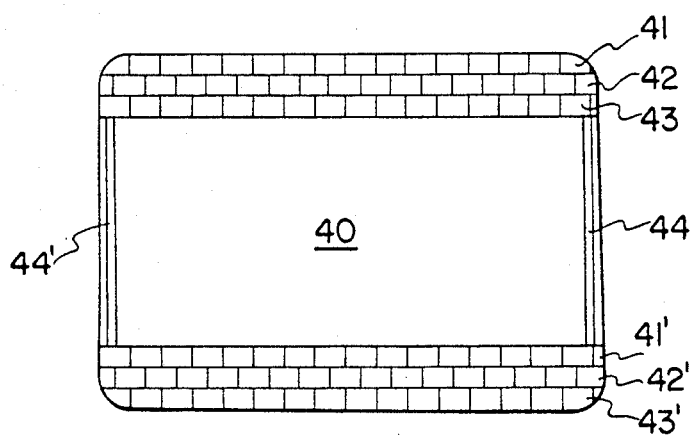
FIG. 6 diagrammatically shows a front view of a screen having an background image of a scene with a superimposed moving pattern band. Other moving images may be superimposed by electronic or optical means known to the art for special time delay 3D effects. Foreground and background scenes are recorded with a panning camera of this invention.

FIG. 6 shows the front of a screen such as a TV tube face 40 having moving bands of patterns 41,42,43,44 and 41',42',43', 44' contiguous with the edges of the screen, and framing the horizontal and vertical edges of the screen. The moving bands of patterns may have different velocities in a horizontal direction. The moving patterns enhance the three dimensional effect, causing the scene to come forward out of the screen plane, or vice vera, depending on the direction of motion of the pattern bands. The images may be viewed by photopic-scotopic eyeglasses, or the photopic-scotopic raster screen described hereinafter. Various moving images or color graphics may be inserted in the scene by computer graphics to enhance depth effects.

Figure 7:
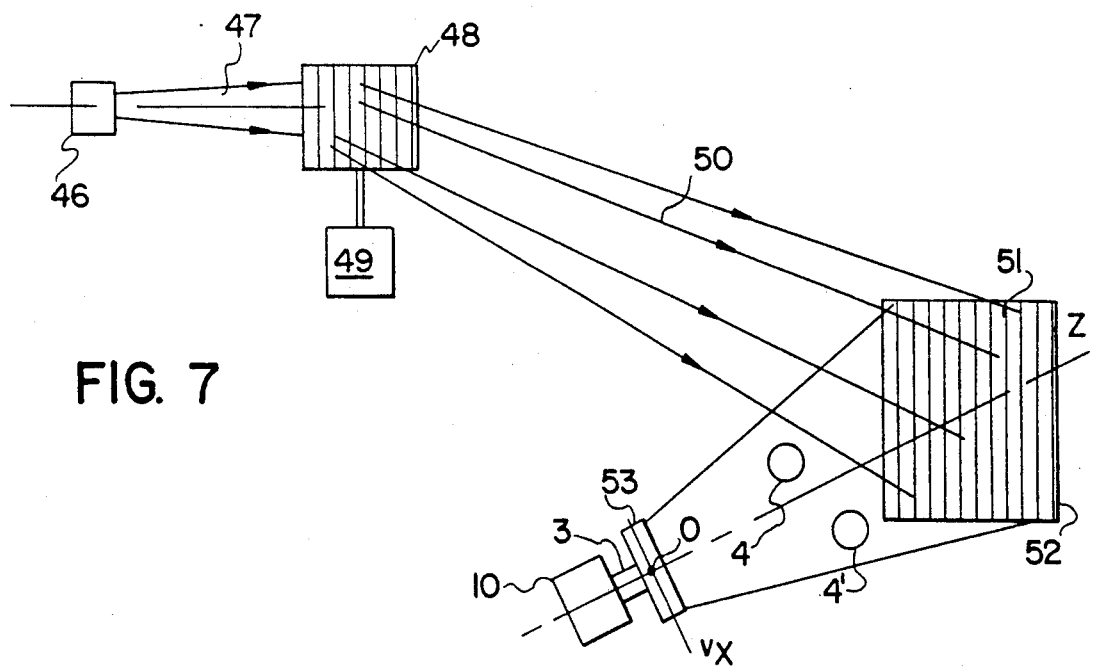
FIG. 7 diagrammatically shows a front view of a rear projection screen with projected scenes which may include a spotlight and revolving drum to provide images moving horizontally relative to foreground real objects and a foreground panning camera for recording the composite scene FIG. 8 diagrammatically shows a standard photopic scotopic eyeglass viewer and a standard screen on which continuously panned time delay 3D images of a scene are projected for continuously and consistently viewing a 3D time delay image of the scene.

FIG. 7 shows another means of introducing moving light patterns into the background of a scene. A light projector 46 emits a beam 47 reflected from a moving mirror drum 48 rotated by a motor 49. A horizontally moving pattern 51 is projected onto screen 52 from the front or back. Objects 4, 4', . . . are in the scene 1 being phographed by the time delay 3D camera 53. The moving light patterns are superimposed onto the background of the scene being photographed. Alternatively the projector 46 may be a motion picture projector which provides moving background images on the screen 51. The images on the screen 52 may move horizontally with selected velocities from right to left, while foreground objects are panned from left to right by the panning camera hereinabove described. In this manner the perceived depth between foreground and background images may be controlled to appear at different depths depending on their horizontal velocities.

Figure 8:
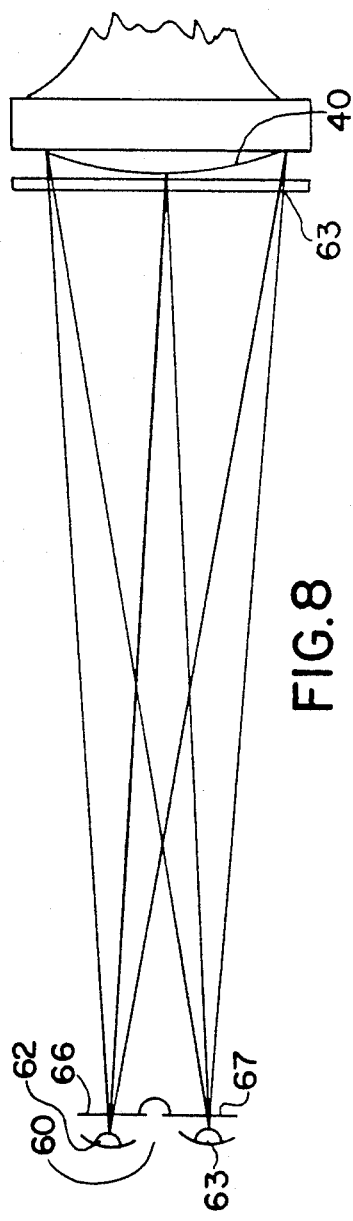
FIG. 8a diagrammatically shows a section through a photopic-scotopic line raster screen with vertical opaque and transparent line slits, and a rear view screen such as a TV CRT tube, which provides time delay 3D without the need for viewer eyeglasses.
FIG. 8b diagrammatically shows a section through a photopic-scotopic raster screen with cylindric lenticules and a rear view screen such as a TV CRT tube, which provides time delay 3D without the need for viewer eyeglasses.
FIG. 8c is a magnified sectional view of the lenticule sheet.
Figure 8A:
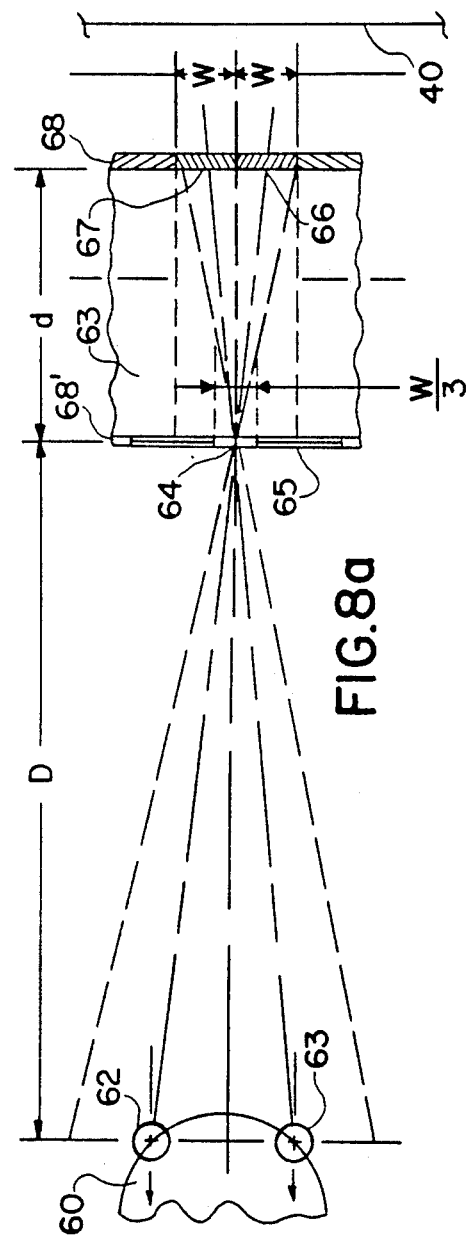
Figure 8B:
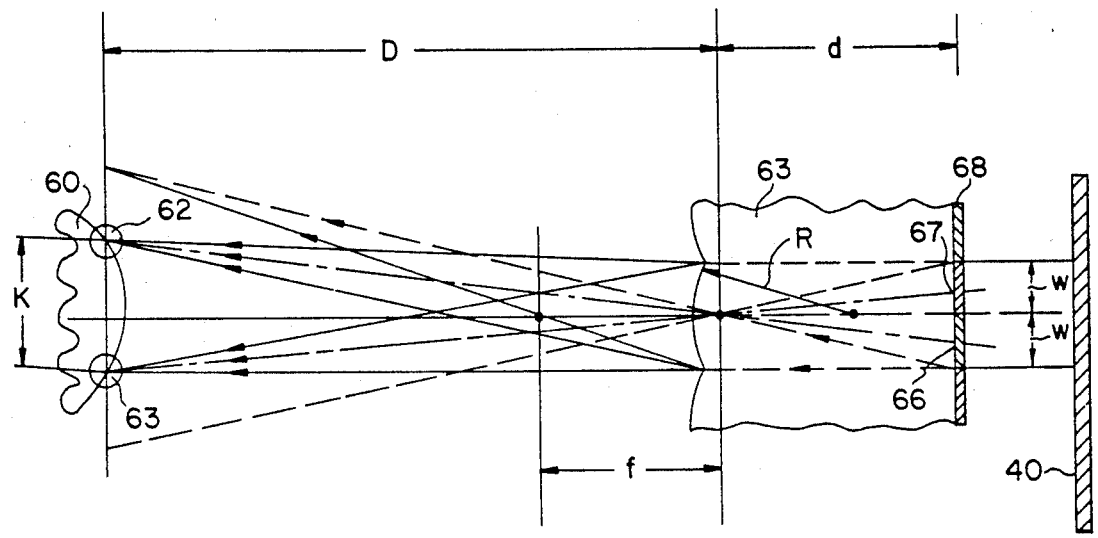
Figure 8C:
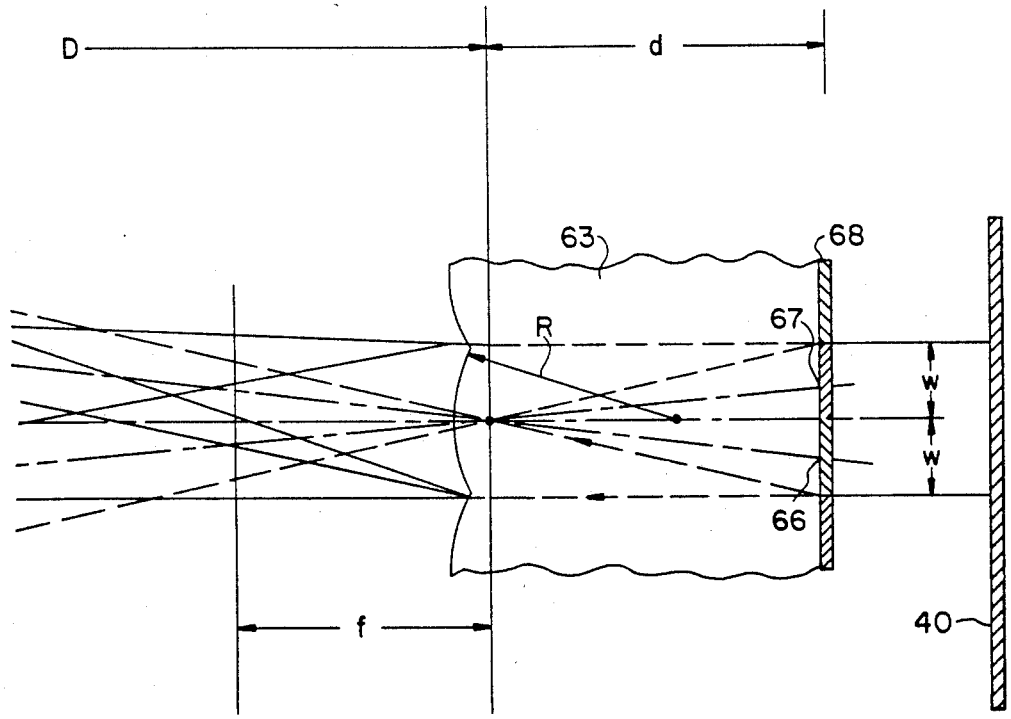

FIGS. 8a and 8b diagrammatically show plan views of a system for seeing photopic-scotopic time delay three dimension pictures without eyeglass viewers, using a photopic scotopic raster sheet in front of the screen. FIGS. 8a and 8b show optical diagrams, respectively, of a photopic scotopic line raster sheet, and a lenticular photopic scotopic raster sheet. FIG. 8c shows a magnified cross section of a single lens element of a lenticular photopic scotopic raster sheet. The photopic-scotopic screens may be placed in front of the screen or laminated thereto forming a composite screen.

Referring to FIG. 8a, the eyes 61, 62 of an observer 60 look at a screen 40, which may be a TV tube face or projection screen, through the photopic scotopic line raster sheet 63. The line raster sheet 63 has alternate clear and opaque vertical strips 64,65 on its front surface 64. The clear strip 64 has a width of about 0.67 w and the opaque strip 65 about 1.33 w. The alternate strips of photopic filters 66 and scotopic filters 67 on its rear surface 68 have equal widths w. In a TV tube about 550 mm wide (22"), with 550 line resolution, the interpixel spacing is: $w_p = 1$ mm. To avoid a moire pattern the width w is considerably less than the interpixel distance; for example, w = 0.1 mm (0.004") or 10 lines/mm (250 lines/"). The sheet thickness d is fixed by the distance D to an average observer's position for example, D = 1,800 mm (6'), the line width is w = 0.1 mm, and the interocular distance is k = 63 mm. Hence:

$$d = D\ w/k = 1,800 \times 0.1\ /63 = 2.86\ mm\ (0.113")$$

Hence a standard plastic sheet such as an acrylic or other known material about 3.12 mm (⅛") thick may be used for the raster.

About one third of the light is lost in the line screen shown in FIG. 8a. It is therefore preferred to employ the lenticular screen shown in FIG. 8b which may have the same dimensions as in FIG. 8a; but the front surface 68' comprises transparent strips of cylindrical lenses 69 of radius R. The image width is w, projected to an image width equal to the interocular distance k. For a single lens surface the radius of curvature is given by the lens equation:

$$(1/f) = (n-1)\ (1/R)$$

For plastic the index of refraction n=about 1.50.

The image plane of the photopic and scotopic filters 65 and 66 is a distance d from the lens center 70. This image is projected a distance D from the lens center 70 to the plane of the observer's eyes at distance D from the lens center 70. Hence $$1/f = (1/D)(1/d)$$

$$1/f = 1/1,800 + (1/2.86)$$

The first term is small compared to the second and may be neglected; so, approximately:

$$R = d(n-1) = 2.86(1.5-1) = 1.43 \text{ mm}$$

In both FIGS. 8a and 8b right and left eyes of the observer each see a different filter; respectively the photopic and scotopic filter colors. This system consistently and continuously produces full color images in time delay 3D. The examples herein are illustrative of the inventions disclosed, and accordingly I do not wish to be limited thereby.

What I claim is:

1. A panning-camera for the recording of time delay three dimensional images of objects in a scene, an arbitrary fixed point P in said scene, said panning-camera comprising a camera, a lens on said camera, said lens having a center C on its optical axis OZ, a deflector A having a reflecting plane at 45° intersecting said optical axis at point O, said point O being the origin of OXYZ rectangular coordinates with its OX axis horizontal, a second deflector B, a first means for respectively rotating and translating said deflector B with an angular velocity $-\omega/2$, and a linear velocity $u_x$, a mounting, said camera and said means being attached to said mounting, said deflector B having a reflecting plane intersecting the said OX axis at point R where $x=a$, the angle OPR being defined as $\theta = a/r$ radians, where r=distance PR from point R to said fixed object point P, and the angular velocity of said panning about said fixed point P being $(d\theta/dt) = \omega$, the plane of said deflector B making an angle of $(45° - \theta/2)$ between its normal RQ and the OX axis, said means rotating said deflector B with an angular velocity $-\omega/2$ from $\theta_1$ to $\theta_2$ about an axis parallel to the OY axis through point R, and simultaneously translating said point R on deflector B along the said OX axis with linear velocity $u_x = \pm\omega r$, from a minimum distance $x = a_1$ to a maximum distance $x = a_2$, said first means periodically returning said deflector to the position where $x = a_1$ and $\theta = \theta_1$, whereby said scene is continuously panned by said panning-camera relative to said optical axis OZ, thereby encoding in said recording a time-delay three dimensional image of said scene.

2. A panning-camera for the recording of time delay three dimensional images of objects in a scene according to claim 1, a third deflector D, a second means for rotating and translating said deflector D respectively with an angular velocity $-\omega/2$, and a linear velocity $u_x$, a third means, said third means periodically rotating said reflector A ±90° about said point O on the OY axis in a time interval less than about 0.03 sec, said first, second and third means being attached to said mounting, said third means rotating said deflector A to +45° angular position when said deflector B is at $x=a_1$, and deflector D is at $x = -a_2$, said deflector A rotating to a $-45°$ angular position when said deflector B is at $x=a_2$ and when deflector D is at $x = -a_2$, said deflector D having a reflecting plane intersecting the said OX axis at point L where $x = -a$, the angle OPL being defined as $\theta = -a/r$ radians, where r=distance PL from point L to said fixed object point P, the angular velocity of said panning about said fixed point being $(d\theta/dt) = \omega$, the plane of said deflector D making an angle of $(45° - \theta/2)$ between its normal LS and the OX axis, said second means rotating said deflector D from $-\theta_2$ to $-\theta_1$ about an axis parallel to to the OY axis through point L, and simultaneously translating said point L along said OX axis with linear velocity $u_x = r$, from the maximum distance $x = -a_2$ to a minimum distance $x = -a_1$, said second means periodically returning said deflector D to the position $x = -a_2$ and $\theta = -\theta_2$, said deflectors B and D alternately panning said scene, whereby said scene is continuously panned with a constant angular velocity about the fixed point P, the right and left light paths from said scene via deflector B and D respectively being periodically switched by said deflector A to said camera lens, such switching being imperceptible when said scene is presented on a screen and viewed by an observer.

3. A panning-camera for the recording of time delay three dimensional images of objects in a scene according to claim 2, deflectors B and D being in the left and right light paths, respectively, an O'X' axis parallel to said OX axis and displaced a distance z=d therefrom, a fourth means, said fourth means comprising a beam splitter E positioned at said point O on said OZ axis, a first shutter and a second shutter, a fixed 45° deflector F to deflect light from said deflector D to said camera lens on axis OZ, said deflector F being positioned at the intersection of said OZ axis and said O'X' axis, said first shutter being positioned on said OZ axis between said beam splitter and said deflector F, said second shutter being positioned on the OX axis between said beam splitter and said deflector B, a fifth means, said fifth means opening and closing said first shutter and said second shutter alternately in a time interval less than about 0.03 sec; all said means being attached to said mounting, said fifth means closing said first shutter in said left light path and opening said second shutter in said right light path when said deflector B is at $x=a_1$, and deflector D is at $x = -a_2$, and opening said first shutter and closing said second shutter when when said deflector B is at $x = a_2$, and deflector D is at $x = -a_2$, said deflectors B and D alternately panning said scene, a compensator lens G in at least one of said light paths, said compensator lens equallizing the focus and size of images produced at said camera by light from said right and left light paths, whereby said scene is continuously panned about said fixed point P, the light paths from the said scene via said deflectors B and D being periodically switched by said fourth and fifth means to said camera lens, such switching being imperceptible when said scene is presented on said screen and viewed by an observer.

4. A panning-camera for the recording of time delay three dimensional images of objects in a scene according to claims 2 or 3, a sixth control means, said sixth control means selecting said angular velocity a/2 of said deflectors B and D, a fifth control means, said fifth control means selecting the said velocities $u_x$ of said deflectors, and thus determining the ratio $u_x/\omega = r$, and selecting the apparent distance to said fixed point P.

5. A panning-camera for the recording of time delay three dimensional images of objects in a scene according to claim 4, an eighth means, said eighth means being a zoom selector on said lens, said seventh means and said eighth means being connected, the velocities $u_x$ of said deflectors being increased as the zoom control focusses at a greater distance to said fixed point P, whereby the apparent distance r to said fixed point P is decreased, and said distant zoom images appear with increased depth.

6. A system for the recording, presentation and viewing by an observer of three dimensional images of objects of a scene, said observer having a first eye and a second eye, comprising a camera for recording said scene, a mounting for said camera, a first means for panning said scene according to claim 1 on said mounting for the continuous panning of said scene, a screen, a second means for presenting the said image on said screen, a third means between the said screen and the said observer for separating said image on said screen into photopic image and scotopic image components and transmitting said photopic image component to said first eye and said scotopic image component to said second eye, said photopic component and said scotopic component being transmitted with a natural time delay to the image processing area of the brain of said observer, said panning motion causing a displacement between said photopic and scotopic image components at said area, said displacement being approximately inversely proportional to the distance of said objects from the said camera, whereby a three dimensional image of said objects is continuously perceived by the said observer.

7. A system for the recording, presentation and viewing by an observer of three dimensional images of objects of a scene according to claim 6 in which the said Camera is a TV Camera.

8. A system for the recording, presentation and viewing by an observer of three dimensional images of objects of a scene according to claim 6 in which said Camera is a Movie Camera for recording said images on film, said second means is a movie projector, and said screen is a movie screen.

9. A system for the recording, presentation and viewing by an observer of three dimensional images of objects of a scene according to claim 6 in which said screen is a TV screen.

10. A system for the continuous recording, presentation and viewing by an observer of three dimensional images ob objects of a scene according to claim 9 in which said screen is a CRT TV screen.

11. A system for the continuous recording, presentation and viewing by an observer of three dimensional images of objects of a scene according to claim 6 in which said screen is a rear projection screen.

12. A system for the recording, presentation and viewing by an observer of there dimensional images of objects of a scene according to claim 6, in which said third means is a raster.

13. A system for the recording, presentation and viewing by an observer of three dimensional images of objects of a scene according to claim 12, said raster comprising a transparent sheet of thickness d, a first and second side on said sheet, said first side being placed toward said screen, and having vertical strips of width b, said strips being photopic and scotopic filters arranged alternately, and said second side alternating vertical transparent strips and opaque strips of width b, each said transparent strip being centered over the line between a said photopic strip and a said scotopic strip.

14. A system for the recording, presentation and viewing by an observer of three dimensional images of objects of a scene according to claim 12, said raster comprising a transparent sheet of thickness d, a first and second side on said sheet, said first side being placed toward said screen, and having vertical strips of width b, said strips being photopic and scotopic filters arranged alternately, and a plurality of positive cylindric lenses in strips of width 2b aligned with each optical center aligned between each said photopic strip and each said scotopic strip, said cylindric lenses comprising cylinders having vertical axes and a radius of curvature r about $=(n-1)d$, said lenses being embossed on said second side of said sheet.

15. A system according to claim 6, in which said third means is a raster for three dimensional viewing of time delay images, said raster comprising a transparent sheet of thickness d, a first and second side on said sheet, said first side being placed toward said screen, and having vertical strips of width w, said strips being photopic and scotopic filters arranged alternately, and said second side alternating vertical transparent strips and opaque strips of width about 0.67 w and 1.33 w, respectively, each said transparent strip being centered over the line between a said photopic strip and a said scotopic strip.

16. A system for the recording, presentation and viewing by an observer of three dimensional images of objects in a scene according to claim 6, in which said third means is a eyeglass viewer having a photopic filter for the first eye, and a scotopic filter for the second eye.

17. In system according to claim 6, means for providing a lighted border strip on said screen, said strip comprising a pattern of light and dark areas moving in one direction, said moving patterns enhancing the 3D effect.

18. A screen for the three dimensional viewing of time delay images, a raster, said raster comprising a transparent sheet of thickness d, a first and second side on said sheet, said first side being placed toward said screen, and having vertical strips of width w, said strips being photopic and scotopic filters arranged alternately, and a plurality of positive cylindric lenses in strips of width 2 w aligned with each optical center aligned between each said photopic strip and each said scotopic strip, said cylindric lenses comprising cylinders having vertical axes and a radius of curvature R about $=(n-1)/d$, where n=index of refraction of said sheet and lenses being embossed on said second side of said sheet.

19. A screen for three dimensional viewing of time delay images according to claim 18, a raster, said raster comprising a transparent sheet of thickness d, a first and second side on said sheet, said first side being placed toward said screen, and having vertical strips of width w, said strips being photopic and scotopic filters arranged alternately, and in which to avoid a moire pattern w is considerably smaller than the pixel spacing on said screen.

20. A screen for three dimensional viewing of time delay images according to claim 18, said raster comprising a transparent sheet of thickness d, a first and second side on said sheet, said first side being placed toward said screen, and having vertical strips of width w, said strips being photopic and scotopic filters arranged alternately, and to avoid a moire pattern w is about 100 $\mu m$.

* * * * *